(12) United States Patent
Bergano (10) Patent No.: US 6,310,709 B1
(45) Date of Patent: Oct. 30, 2001

(54) SYNCHRONOUS POLARIZATION AND PHASE MODULATION USING A PERIODIC WAVEFORM WITH COMPLEX HARMONICS FOR IMPROVED PERFORMANCE OF OPTICAL TRANSMISSION SYSTEMS

(75) Inventor: Neal S. Bergano, Lincroft, NJ (US)

(73) Assignee: Tyco Submarine Systems Ltd., Morristown, NJ (US)

( * ) Notice: Subject to any disclaimer, the term of this patent is extended or adjusted under 35 U.S.C. 154(b) by 0 days.

(21) Appl. No.: 08/580,869

(22) Filed: Dec. 29, 1995

(51) Int. Cl.$^7$ .................................................... H04B 10/04
(52) U.S. Cl. .......................... 359/183; 359/158; 359/161; 359/181
(58) Field of Search ..................................... 359/158, 161, 359/180, 181, 183, 187

(56) References Cited

U.S. PATENT DOCUMENTS

| | | | |
|---|---|---|---|
| 4,965,857 | 10/1990 | Auracher et al. | 455/618 |
| 5,107,358 | 4/1992 | Hodgkinson et al. | 359/124 |
| 5,309,530 | 5/1994 | Bergano et al. | 385/1 |
| 5,309,535 | 5/1994 | Bergano et al. | 385/38 |
| 5,345,331 | 9/1994 | Bergano et al. | 359/341 |
| 5,361,270 | 11/1994 | Heismann | 372/27 |
| 5,473,458 | * 12/1995 | Mamyshev et al. | 359/161 |

OTHER PUBLICATIONS

"Dual–Wavelength Data Transmitter for Reducing Facing in an Optical Transmission System", N. S. Bergano 10, Ser. No. 08/173288, filed Dec. 23, 1993.

"Synchronous Polarization and Phase Modulation for Improved Performance of Optical Transmission Systems", N. S. Bergano 11, Ser. No. 08/312848, filed Sep. 27, 1994.

"Spectral and Polarization Hole Burning in Neodymium Glass Lasers", D. W. Hall et al., IEEE Journal of Quantum Electronics, vol. QE–19, No. 11, Nov. 1983.

\* cited by examiner

*Primary Examiner*—Leslie Pascal
(74) *Attorney, Agent, or Firm*—Mark K. Young; Stuart H. Mayer (57) ABSTRACT

A method and apparatus is provided that yields improved performance by modulating the optical phase and polarization of an optical signal with a periodic waveform having harmonic content that is more complex than that associated with a simple sinusoidal waveform. A phase modulator receives an optical signal onto which data has been modulated at a predetermined frequency. The phase modulator modulates the phase of the optical signal in a continuous manner with the periodic waveform with complex harmonics where the fundamental phase modulation frequency is equal to the same predetermined frequency at which the data is modulated onto the optical signal. In another illustrative embodiment of the invention, a polarization modulator further processes the optical signal by modulating the state-of-polarization of the signal in a continuous fashion with the periodic waveform with complex harmonics where the fundamental polarization modulation frequency is equal to the same predetermined frequency at which the data is modulated onto the optical signal. In addition to being continuously modulated, the polarization modulation is performed so that the average value of the state of polarization over each modulation cycle is substantially equal to zero.

35 Claims, 4 Drawing Sheets

SYNCHRONOUS POLARIZATION AND PHASE MODULATION USING A PERIODIC WAVEFORM WITH COMPLEX HARMONICS FOR IMPROVED PERFORMANCE OF OPTICAL TRANSMISSION SYSTEMS

TECHNICAL FIELD

The invention relates to the optical transmission of information and, more particularly, to synchronous polarization and phase modulation using a periodic waveform with complex harmonics for improved performance of optical transmission systems.

BACKGROUND OF THE INVENTION

Very long optical fiber transmission paths, such as those employed in undersea or transcontinental terrestrial lightwave transmission systems which employ optical amplifier repeaters, are subject to decreased performance due to a host of impairments that accumulate along the length of the optical fiber comprising the transmission path. Typically, these impairments vary with time and cause a random fluctuation in the signal-to-noise ratio of the received signal. These impairments can arise from accumulated noise effects caused, for example, by polarization hole-burning ("PHB") in the erbium-doped fiber used in the optical amplifiers and waveform distortions caused by chromatic dispersion and optical nonlinearities throughout the transmission path. Scrambling the state-of-polarization of the launched optical signal to depolarize the optical carrier can improve the received signal-to-noise by reducing PHB. In my co-pending U.S. patent application Ser. No. 08/312,848, an arrangement is disclosed where the polarization scrambling frequency is chosen as the clock frequency that defines the bit rate of the transmitter. Such a technique may provide for more efficient use of optical bandwidth in wavelength division multiplexed ("WDM") systems. This bit-synchronous polarization scrambling is also a particularly advantageous trade-off between the two regimes of low-speed and high-speed scrambling. In addition to the synchronous polarization scrambling, superimposed phase modulation ("PM") can dramatically increase the eye opening of the received data pattern. The increase in eye opening results from the conversion of PM into bit-synchronous amplitude modulation ("AM") through chromatic dispersion and nonlinear effects in the fiber.

SUMMARY OF THE INVENTION

In accordance with the present invention, a method and apparatus is provided that yields improved performance by modulating the optical phase and polarization of an optical signal with a periodic waveform having harmonic content that is more complex than that associated with a simple sinusoidal waveform. A phase modulator receives an optical signal onto which data has been modulated at a predetermined frequency. The phase modulator modulates the phase of the optical signal in a continuous manner with the periodic waveform with complex harmonics where the fundamental phase modulation frequency is equal to the same predetermined frequency at which the data is modulated onto the optical signal. In another illustrative embodiment of the invention, a polarization modulator further processes the optical signal by modulating the state-of-polarization of the signal in a continuous fashion with the periodic waveform with complex harmonics where the fundamental polarization modulation frequency is equal to the same predetermined frequency at which the data is modulated onto the optical signal. In addition to being continuously modulated, the polarization modulation is performed so that the average value of the state of polarization over each modulation cycle is substantially equal to zero.

DETAILED DESCRIPTION

Figure 1:
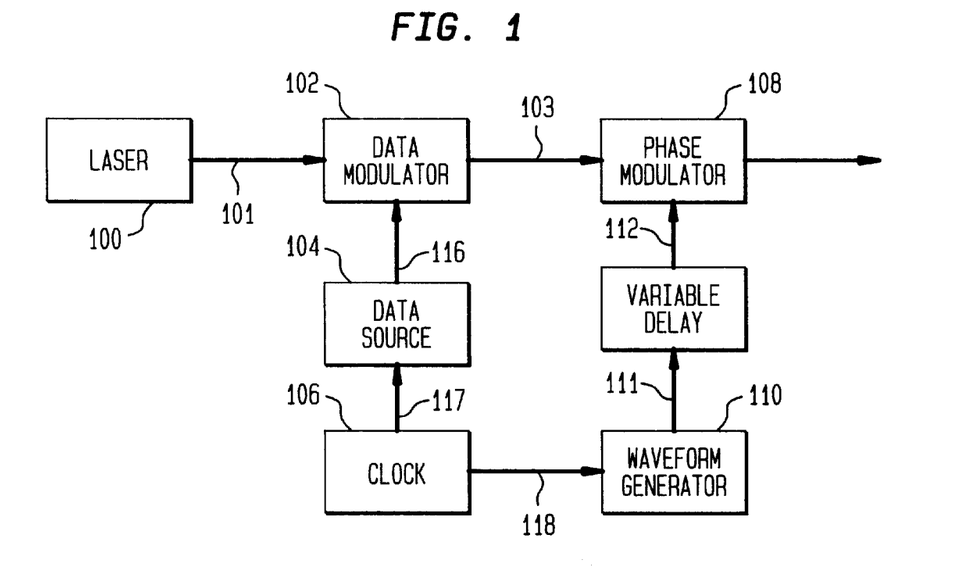
FIG. 1 shows a simplified block diagram of one embodiment of phase modulated transmitter in accordance with the present invention.

FIG. 1 shows a simplified block diagram of an exemplary arrangement facilitating the practice of the invention. As shown, the invention includes a laser 100 for producing a continuous wave ("CW") optical signal 101. The optical signal 101 is transmitted to a data modulator 102 that modulates the signal to impart information in a conventional manner to produce a modulated optical information signal 103. The data modulator 102 receives the signal data 116 to be imparted to the optical signal 101 from a data source 104. Data modulator 102 modulates the optical signal 101 at a frequency determined by a clock 106 via a clock signal on line 117. The optical information signal 103 is transmitted from data modulator 102 to a phase modulator 108. Phase modulator 108 modulates the phase of the optical carrier (i.e., optical signal 101) onto which the data signal has been modulated. In accordance with the principles of the present invention, phase modulator 108 is driven by a periodic waveform 112. Periodic waveform 112 is generated using a waveform generator 110 and a variable-delay element. Waveform generator 110 generates a periodic control signal 111. The periodic control signal 111 has the same fundamental frequency as a clock 106, and is furthermore phase-locked to clock 106 via a clock signal on line 118.

The relative delay between the signal data 116 carried on optical information signal 103 and the periodic waveform 112 is determined by variable-delay element 107. As shown in FIG. 1, variable-delay element 107 is coupled to receive periodic control signal 111 from waveform generator 110. The delay is set to facilitate the optimization of the transmission performance of a system using the phase modulator described above. For example, the delay may be set to maximize the signal-to-noise ratio or Q-Factor received at a remote receiver. It is emphasized, however, that variable-delay element 107 is considered optional and may be deleted in some applications of the invention. The manner in which periodic waveform 112 drives the phase modulator 108 may be described by examining the electric field of the optical signal on which the phase modulator acts:

$$E(t) = A(t)e^{i(\omega t + \phi(t))} \tag{1}$$

where $\omega$ is the optical carrier frequency, $\phi(t)$ is the phase angle of the optical signal 105 and A (t) is assumed to be real field amplitude and include the intensity modulation. It is assumed that the optical phase ϕ(t) is driven with a periodic function f(x), as described by Equation 2 below:

$$\phi(t)=\gamma+\alpha f(\Omega t+\Psi) \quad (2)$$

Here α is the optical phase modulation index, Ω is the phase modulation frequency (corresponding to the bit rate), Ψ describes the relative delay between the PM and the data bits, and γ denotes an arbitrary offset. The time function f(t) is generated in the phase waveform generator 110. By introducing the phase Ψ as an additional selectively adjustable parameter, various amplitude errors that adversely effect performance when using a non-return to zero ("NRZ") modulation format can be reduced. These amplitude errors may be caused by a variety of factors including amplifier noise, chromatic dispersion and fiber nonlinearities. As mentioned above, the AM generated from the conversion of polarization and phase modulation, which is caused by an interaction between the signal and the chromatic dispersion and nonlinear index of refraction of the fiber, can be beneficial if the phase of the AM is properly adjusted with respect to the data. A graphical method for evaluating the impact of impairments to a signal other than noise is known to those of ordinary skill in the art as an eye diagram. The AM that is generated can "open" the eye of the received data and compensate for eye closure caused by amplitude types of errors. By properly adjusting the phase Ψ, the eye opening can be improved. In operation, the phase Ψ is adjusted via the variable-delay element 107 until the signal-to-noise ratio ("SNR") of the received optical signal is optimized.

Figure 2:
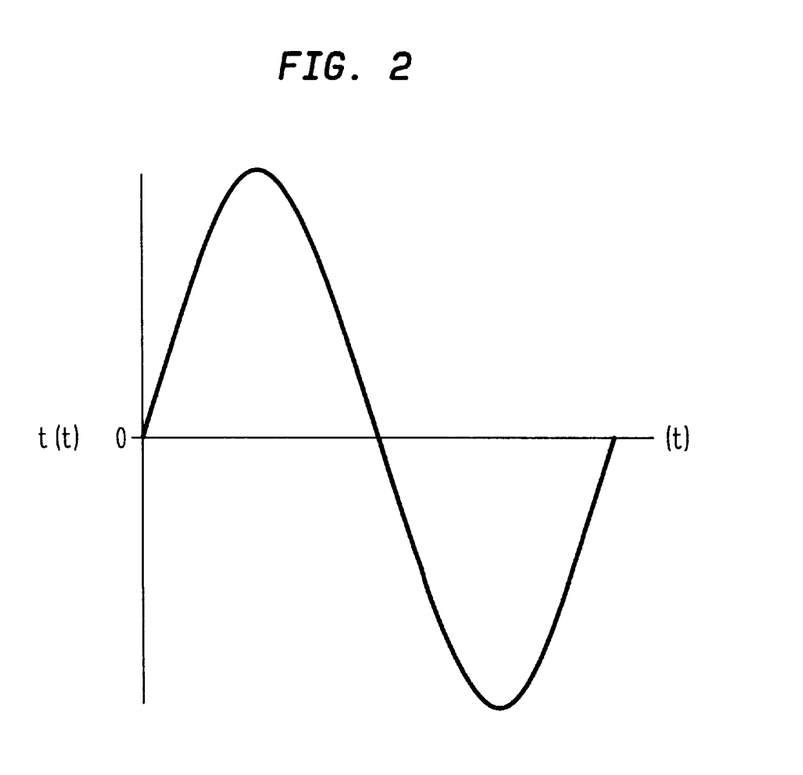
FIGS. 2–5 shows exemplary waveforms used to drive the phase modulator in FIG. 1.
Figure 3:
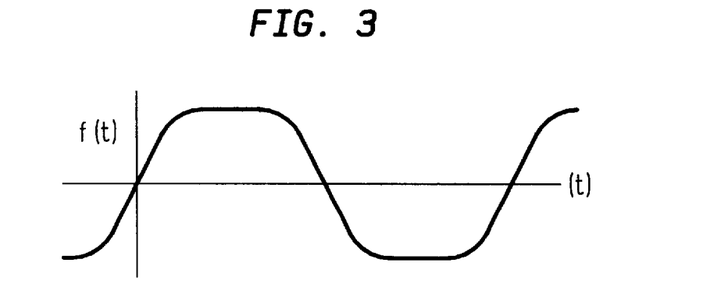
Figure 4:
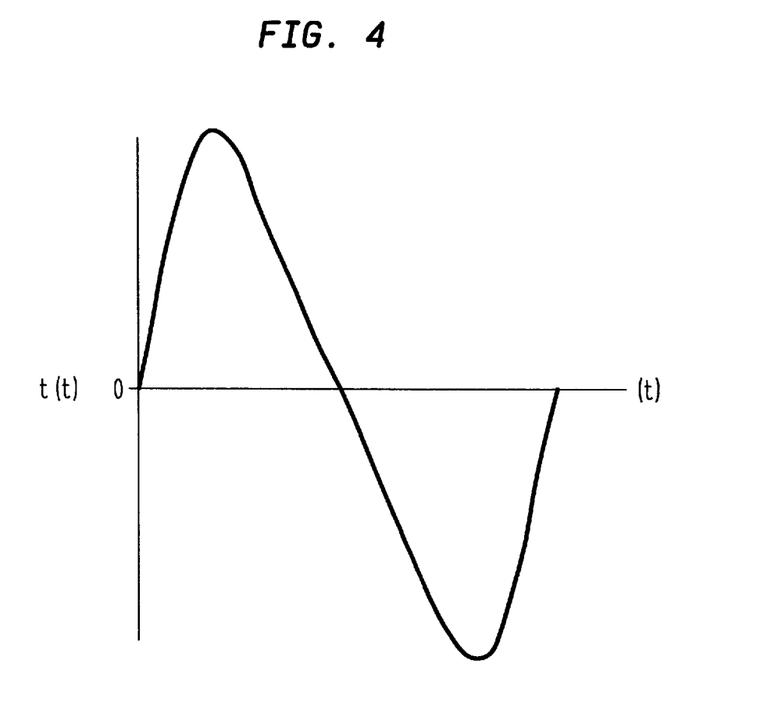
Figure 5:
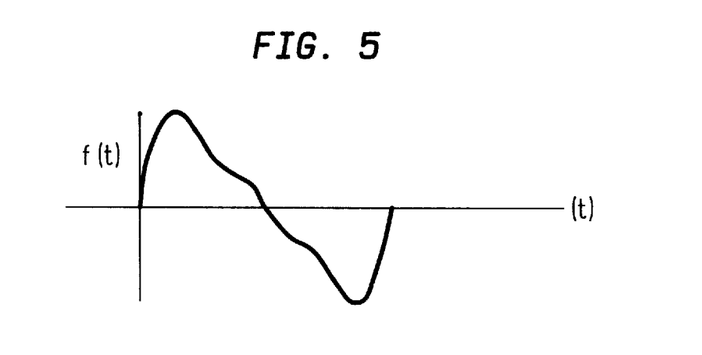

FIGS. 2–5 shows examples of periodic waveforms f(t) used to phase modulate the optical information signal 103 (FIG. 1). The waveform shown in FIG. 2 is a simple sinusoidal signal as disclosed in the aforementioned co-pending application. The waveforms shown in FIGS. 3–5 are examples of waveforms that include more elaborate harmonic content which are designed to improve on the performance of optical transmission systems in accordance with the principles of the present invention. The waveform shown in FIG. 3 is a band-limited squarewave, or a squarewave with finite transition regions. This waveform is used to place a time varying phase on the edges of the data bits. As is known by those skilled in the art, a time varying phase is equivalent to a frequency change through the relationship:

$$\Delta f = \frac{d\phi(t)}{dt} \quad (3)$$

where Δf represents frequency deviation.

The waveforms shown in FIGS. 4 and 5 are provided as examples of a practical approximation to a ramp function. The waveform shown in FIG. 4 is a sinusoid with sinusoidal frequency modulation and is described by the following expression:

$$f(t)=\sin(t+0.6*\sin(t)) \quad (4)$$

The waveform shown in FIG. 5 is a generated by a series of sinusoidal signals and is described by the following expression:

$$f(t)=\sin(t)+0.4*\sin(2t)+0.2*\sin(4t) \quad (5)$$

Figure 6:
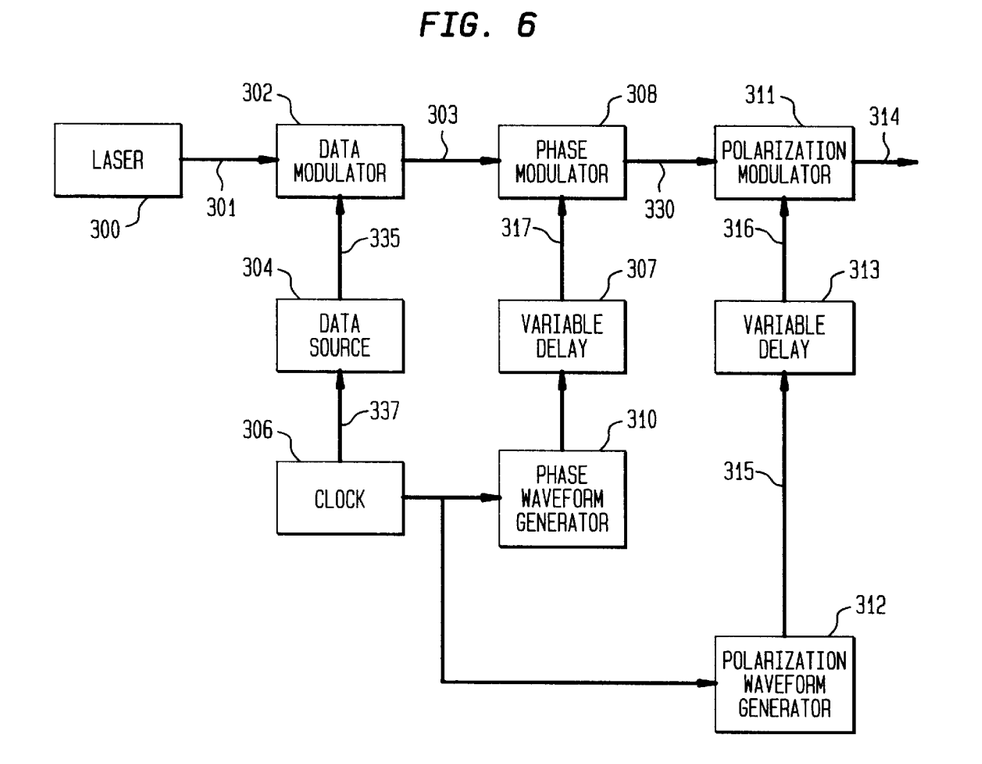
FIG. 6 shows a simplified block diagram of one embodiment of a phase and polarization modulated transmitter in accordance with the present invention.

FIG. 6 shows an alternative embodiment of the invention in which a polarization modulation function has been added to the output of the apparatus shown in FIG. 1. Laser 300 for produces a CW optical signal 301. The optical signal 301 is transmitted to a data modulator 302 that modulates the signal to impart information thereto in a conventional fashion, producing a modulated optical information signal 303. The data modulator 302 receives the data to be imparted to the optical signal 301 from a data source 304 on line 335 and modulates the optical signal 301 at a frequency determined by a clock 306 via clock signal 337. The optical information signal 303 is transmitted from the data modulator 302 to a phase modulator 308 which modulates the phase of the optical information signal 303. Phase modulator 308 operates as described above when referring to FIG. 1. The phase modulated signal 330 emerging from phase modulator 308 is directed to a polarization modulator 311 which modulates the state-of-polarization ("SOP") of the optical information signal 303. Polarization modulator 311 operates to change the SOP of the optical information signal in such a way that it has no preferred SOP averaged over the modulation period. Accordingly, the output signal 314 has a degree of polarization that is substantially zero and is said to be polarization scrambled. In one example of the operation of the polarization modulator 311, the SOP of optical information signal 303 traces a complete great circle on the Poincaré sphere. Alternatively, the SOP of the optical signal may reciprocate along the Poincaré sphere. In either case, the average value of the SOP over each modulation cycle is substantially equal to zero. One example of a polarization modulator 108 that may be employed in the present invention is disclosed in U.S. Pat. No. 5,327,511, particularly in FIG. 3 of that reference.

In accordance with the present invention, the polarization modulator 311 is driven a periodic waveform 316 generated by a polarization waveform generator 312. As with the embodiment shown in FIG. 1, periodic waveform 316 may take any of the exemplary forms shown in FIGS. 2–5, in accordance with the principles of the invention. The periodic waveform has the same fundamental frequency as clock 306, and is furthermore phase locked to clock 306. The relative delay between signal data modulated onto signal 303 and the periodic waveform 315 generated in 312 is set by a variable-delay element 313. The manner in which the periodic waveforms 317 and 316 drive the phase modulator 308 and polarization modulator 311, respectively, may be described by examining the electric field of the optical signal on which the phase modulator acts. In x–y coordinates these components may be expressed as follows:

$$E_x(t)=A_x(t)e^{i(\omega t+\phi_x(t))} \quad (6)$$

$$E_y(t)=A_y(t)e^{i(\omega t+\phi_y(t))} \quad (7)$$

where ω is the optical carrier frequency, $\phi_x(t)$ and $\phi_y(t)$ are the phase angles of the optical signal 314 and $A_x(t)$ and $A_y(t)$ are assumed to be real field amplitudes and include the intensity modulation. In principle, every possible SOP of an optical signal having these electric field components can be obtained by varying the ratio $A_x/A_y$ while maintaining the value of $(A_x^2+A_y^2)$ constant and varying the relative phase difference $\phi_x-\phi_y$ between 0 and 2π. However, the polarization modulator 308 serves to modulate the SOP of the optical signal by varying only the phases $\phi_x$ and $\phi_y$, which is sufficient to provide a SOP whose average value over a modulation cycle is zero. This phase modulation may be written as:

$$\phi_x(t)=\gamma_x+\alpha f_1(\Omega t+\Psi_1)+b_x f_2(\Omega t+\Psi_2) \quad (8)$$

$$\phi_y(t)=\gamma_y+\alpha f_1(\Omega t+\Psi_1)+b_y f_2(\Omega t+\Psi_2) \quad (9)$$

As Equations 8 and 9 indicate, the phase modulator 308 imparts the same phase modulation to both the x and y components of the optical signal 303 since they have the same phase modulation index α. Accordingly, the phase modulator 308 modulates the optical phase of signal 303 without modulating the polarization of the optical signal. The reason the phase modulator 308 does not modulate the polarization is because the polarization modulation of the optical signal is proportional to the difference between the phases $\phi_x$ and $\phi_y$ and this difference is unaffected by the phase modulator 308 since it modulates both $\phi_x$ and $\phi_y$ by equal amounts.

There are two categories of phenomena that can convert the polarization and/or the phase modulation to AM modulation, namely, those that are polarization dependent, and those that are polarization independent. An example of a polarization dependent phenomena is mediated by polarization dependent loss ("PDL") in the transmission medium, and as such, can fluctuate over time, causing additional signal fading. An example of a polarization independent phenomena is mediated by chromatic dispersion and/or a nonlinear index of refraction in the transmission fiber and as such does not fluctuate in time. As explained below, the AM generated by modulating the polarization at the bit rate does not significantly contribute to signal fading, When a polarization scrambled signal encounters an element having PDL, AM modulation can occur at the modulation frequency Ω and harmonics thereof (i.e., 2Ω, 3Ω, . . . ). The amount of AM, and the phase relationship of the AM with respect to the phase of the polarization modulation depends, in general, on the orientation of the loss axis of the PDL element with respect to the polarization modulation axis. The amount of AM that occurs will fluctuate with time because the state-of-polarization of the optical signal varies with time. As will be appreciated by those skilled in the art, a typical fiber optic receiver has an electrical bandwidth of about 60% of the data rate. Thus, some of the AM occurring at the bit rate can pass through the receiver to the decision circuit and effect the BER. However, the BER is unaffected by AM that occurs at harmonics of the bit rate having a frequency of 2Ω or higher since these harmonics are blocked by the receiver. From an analysis of the formation of AM caused by the interaction between the reciprocating SOP of the optical signal and the PDL elements, it can be shown that the majority of the AM modulation occurs at harmonics of the modulation frequency (i.e., 2Ω and higher) and not at the fundamental modulation frequency Ω. Thus, as noted above, the AM generated by modulating the polarization at the bit rate does not significantly contribute to signal fading, assuming a properly designed optical receiver is employed. The AM generated by the conversion of polarization and/or phase modulation as a result of the chromatic dispersion and/or the nonlinear index of refraction of the optical fiber can be beneficial if the polarization modulation is performed at the bit rate.

Figure 7:
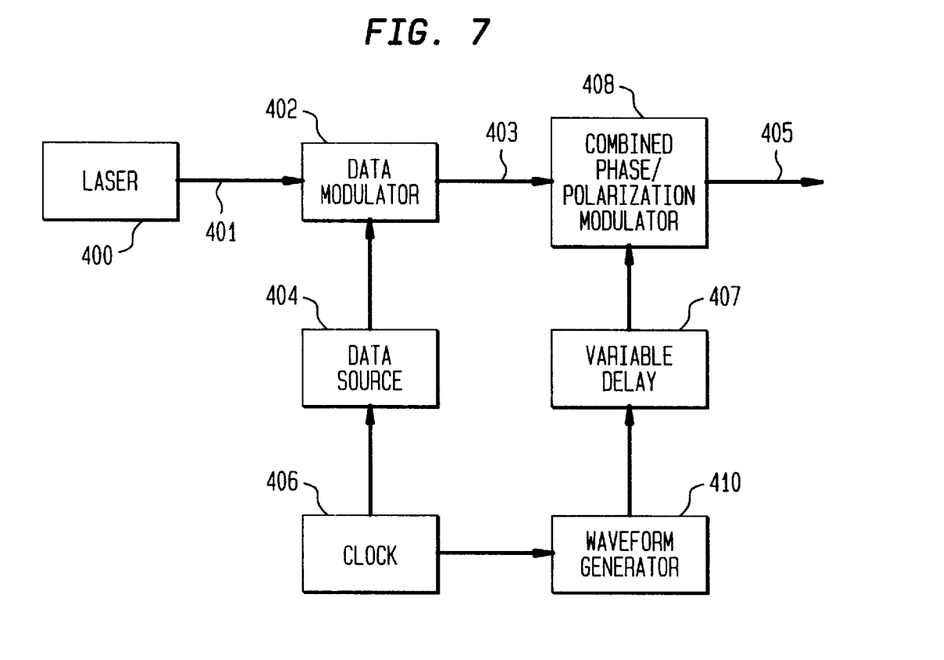
FIG. 7 shows a simplified block diagram of an alternative embodiment of the phase and polarization modulated transmitter where the phase and polarization modulation is accomplished in a single in accordance with the present invention.

In FIG. 7, the functions of the phase modulator 308 and the polarization modulator 311 shown in FIG. 6 are both incorporated into a single unit 408. In this embodiment of the invention, a single variable-delay element 407 is used to vary both the polarization modulation and the optical phase modulation. The polarization modulation is given by the difference in the angles $\phi_1-\phi_2$ and is adjusted for a low degree of polarization. The excess phase modulation is given by the average of the two angles $(\phi_1+\phi_2)/2$. The operation of this embodiment of the invention is similar to that shown in FIG. 6 using the following expression:

$$\Psi_1=\Psi_2 \text{ and } f_1(t)=f_2(t). \tag{8}$$

Figure 8:
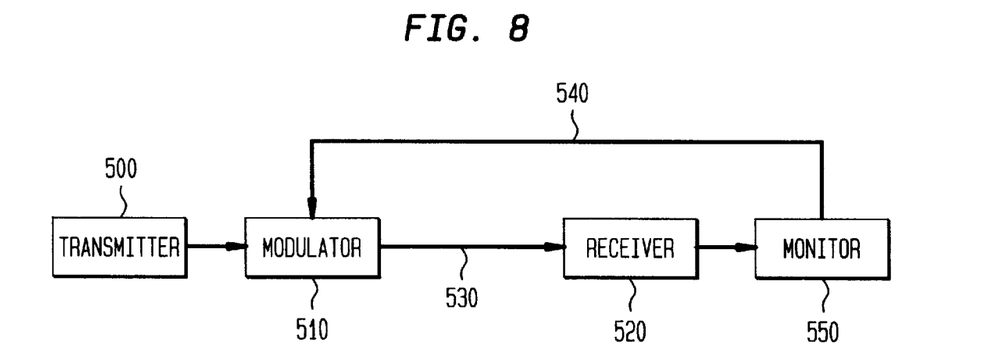
FIG. 8 is a simplified block diagram of a transmission system architecture embodying principles of the invention.

FIG. 8 is a simplified block diagram of a transmission system architecture embodying principles of the invention. A transmitter 500 which includes a laser, data source, data modulator, and clock (not shown), is coupled to a modulator 510. In this illustrative transmission system architecture, modulator 510 includes both phase and polarization modulation, that is, it is configured in a similar arrangement as elements shown in FIG. 4 and described above, and thus, embodies the advantageous characteristics provided therein. Alternatively, modulator 510 may only embody the characteristics of the phase modulator as shown in FIG. 1 (i.e., not implementing the above-described polarization modulation). A receiver 520 is coupled to modulator 510 via a forward transmission path 530. A monitor 550 is coupled to receiver 520 for measuring performance characteristics of the optical signal received at the receiver 520. Monitor 550 may be, for example, a conventional bit-error-rate detector. A return telemetry path 540 couples monitor 550 to modulator 510. Such performance characteristics include SNR or Q-factor. The measured performance characteristic may be transmitted via telemetry path 540 to modulator 510. As discussed above, the phase Ψ (i.e., relative delay) parameter in Equation 2 may then be adjusted in modulator 510 in response to the measured performance characteristic in order to optimize transmission system performance.

It will be understood that the particular techniques described above are only illustrative of the principles of the present invention, and that various modifications could be made by those skilled in the art without departing from the scope and spirit of the present invention, which is limited only by the claims that follow.

The invention claimed is:

1. An apparatus, comprising:
   an optical signal source for generating an optical signal onto which data is modulated at a predetermined frequency;
   a phase modulator coupled to said optical signal source for modulating the phase of said optical signal;
   a phase modulator coupled to said optical signal source for modulating the phase of said optical signal;
   a periodic waveform generator coupled to said phase modulator for generating a periodic control signal for controlling the modulation cycle of said phase modulator; and
   a clock coupled to said phase modulator having a frequency that determines the periodicity of said control signal, wherein said clock frequency is equal to said predetermined frequency, wherein said control signal is a function of time f(t) described by f(t)=sin (t+0.6*sin (t)).

2. The apparatus of claim 1 wherein the optical signal source includes a continuous-wave optical signal generator and a data source, said clock being coupled to the data source for establishing the predetermined frequency at which data is modulated onto said optical signal.

3. The apparatus of claim 1 further comprising a variable-delay element coupling said waveform generator to said phase modulator for selectively varying a relative delay between said optical signal and said control signal.

4. The apparatus of claim 1 wherein said phase modulator is phase-locked to said clock.

5. The apparatus of claim 1 wherein said phase modulator provides optical phase modulation to the optical signal while imparting substantially no polarization modulation to the optical signal.

6. The apparatus of claim 5 wherein said clock is coupled to said phase modulator so that said phase modulator provides optical phase modulation at a frequency that is phase locked and equal to said predetermined frequency.

7. An apparatus, comprising:
an optical signal source for generating an optical signal onto which data is modulated at a predetermined frequency;
a phase modulator coupled to said optical signal source for modulating the phase of said optical signal;
a periodic waveform generator coupled to said phase modulator for generating a periodic control signal for controlling the modulation cycle of said phase modulator; and
a clock coupled to said phase modulator having a frequency that determines the periodicity of said control signal, wherein said clock frequency is equal to said predetermined frequency,
wherein said control signal is a function of time f(t) described by $f(t)=\sin(t)+0.4*\sin(2t)+0.2*\sin(4t)$.

8. The apparatus of claim 7 wherein the optical signal source includes a continuous-wave optical signal generator and a data source, said clock being coupled to the data source for establishing the predetermined frequency at which data is modulated onto said optical signal.

9. The apparatus of claim 7 further comprising a variable-delay element coupling said waveform generator to said phase modulator for selectively varying a relative delay between said optical signal and said control signal.

10. The apparatus of claim 7 wherein said phase modulator is phase-locked to said clock.

11. The apparatus of claim 7 wherein said phase modulator provides optical phase modulation to the optical signal while imparting substantially no polarization modulation to the optical signal.

12. The apparatus of claim 11 wherein said clock is coupled to said phase modulator so that said phase modulator provides optical phase modulation at a frequency that is phase locked and equal to said predetermined frequency.

13. An apparatus, comprising:
an optical signal source for generating an optical signal onto which data is modulated at a predetermined frequency;
a phase modulator coupled to said optical signal source for modulating the phase of said optical signal;
a periodic waveform generator coupled to said phase modulator for generating a periodic control signal for controlling the modulation cycle of said phase modulator; and
a clock coupled to said phase modulator having a frequency that determines the periodicity of said control signal, wherein said clock frequency is equal to said predetermined frequency,
wherein said control signal is a periodic signal having a fundamental frequency and at least one higher harmonic frequency.

14. The apparatus of claim 13 wherein the optical signal source includes a continuous-wave optical signal generator and a data source, said clock being coupled to the data source for establishing the predetermined frequency at which data is modulated onto said optical signal.

15. The apparatus of claim 13 further comprising a variable-delay element coupling said waveform generator to said phase modulator for selectively varying a relative delay between said optical signal and said control signal.

16. The apparatus of claim 13 wherein said phase modulator is phase-locked to said clock.

17. The apparatus of claim 13 wherein said phase modulator provides optical phase modulation to the optical signal while imparting substantially no polarization modulation to the optical signal.

18. The apparatus of claim 13 wherein said clock is coupled to said phase modulator so that said phase modulator provides optical phase modulation at a frequency that is phase locked and equal to said predetermined frequency.

19. A method for modulating an optical signal comprising the steps of:
receiving an optical signal onto which data has been modulated at a predetermined frequency; and
phase modulating said received optical signal with a periodic waveform at said predetermined frequency
wherein said periodic waveform includes a fundamental frequency substantially equal to said predetermined frequency and at least one higher harmonic frequency.

20. The method of claim 19 further comprising the step of modulating a state of polarization of said optical signal at a frequency which is phase locked and equal to said predetermined frequency by tracing the polarization of said optical signal along at least a portion of a Poincaré sphere such that an average value of the state of polarization over each modulation cycle is substantially equal to zero.

21. The method of claim 20 further comprising the step of selectively varying the phase of the polarization modulation imparted to said optical signal.

22. The method of claim 20 further comprising the step of selectively phase modulating the optical signal while imparting substantially no polarization modulation to the optical signal.

23. The method of claim 22 wherein the step of selectively phase modulating the optical signal comprises the step of selectively phase modulating the optical signal at a frequency equal to said predetermined frequency at which data is modulated.

24. The method of claim 19 wherein said periodic waveform is a function of time f(t) described by $f(t)=\sin(t+0.6*\sin(t))$.

25. The method of claim 19 wherein said periodic waveform is a function of time f(t) described by $f(t)=\sin(t)+0.4*\sin(2t)+0.2*\sin(4t)$.

26. An apparatus, comprising:
a polarization modulator adapted to receive an optical signal that is modulated with data at a predetermined frequency and for modulating the state of polarization of the optical signal by tracing the polarization of said optical signal along at least a portion of a Poincaré sphere such that an average value of the state of polarization over a modulation cycle is substantially equal to zero;
a phase modulator coupled to said polarization modulator for modulating the phase of said optical signal; and
a first periodic waveform generator coupled to said phase modulator for generating a first periodic control signal for controlling the modulation cycle of said phase modulator where said first periodic control signal includes a fundamental frequency substantially equal to said predetermined frequency and at least one higher harmonic frequency.

27. The apparatus of claim 26 further including a second periodic waveform generator coupled to said polarization modulator for generating a second periodic control signal for controlling the modulation cycle of said polarization modulator where said second periodic control signal includes a fundamental frequency substantially equal to said predetermined frequency and at least one higher harmonic frequency.

28. The apparatus of claim 26 further comprising a first variable delay element disposed between said first waveform generator and said phase modulator for selectively varying a relative delay between said optical signal and said first control signal.

29. The apparatus of claim 28 wherein said first variable delay element or said second variable delay element is varied to optimize a predetermined characteristic measured by a receiver that receives said optical signal.

30. The apparatus of claim 29 wherein said predetermined characteristic is the signal-to-noise ratio of the optical signal received by said receiver.

31. The apparatus of claim 29 wherein said predetermined characteristic is the Q-factor of the optical signal received by the receiver.

32. The apparatus of claim 26 further comprising a second variable delay element disposed between said first waveform generator and said polarization modulator for selectively varying a relative delay between said optical signal and said second control signal.

33. The apparatus of claim 26 further including a clock coupled to said first waveform generator having a clock frequency that determines the frequency of the predetermined frequency and the fundamental frequency.

34. An apparatus, comprising:

a polarization modulator adapted to receive an optical signal that is modulated with data at a predetermined frequency and for modulating the state of polarization of the optical signal by tracing the polarization of said optical signal along at least a portion of a Poincaré sphere such that an average value of the state of polarization over a modulation cycle is substantially equal to zero;

a periodic waveform generator coupled to said polarization modulator for generating a periodic control signal for controlling the modulation cycle of said polarization modulator where said periodic control signal includes a fundamental frequency substantially equal to said predetermined frequency and at least one higher harmonic frequency.

35. The apparatus of claim 34 further including a clock coupled to said waveform generator having a clock frequency that determines the predetermined frequency and the fundamental frequency.

* * * * *

UNITED STATES PATENT AND TRADEMARK OFFICE
CERTIFICATE OF CORRECTION

PATENT NO. : 6,310,709 B1
DATED : October 30, 2001
INVENTOR(S) : Neal S. Bergano Page 1 of 1

It is certified that error appears in the above-identified patent and that said Letters Patent is hereby corrected as shown below:

Column 6,
Lines 39-40, please delete the second occurrence of the phrase "a phase modulator coupled to said optical signal source for modulating the phase of said optical signal;".

Signed and Sealed this

Twenty-eighth Day of May, 2002

*Attest:*

*Attesting Officer*

JAMES E. ROGAN
*Director of the United States Patent and Trademark Office*